United States Patent
Schenk

(10) Patent No.: US 7,342,975 B2
(45) Date of Patent: Mar. 11, 2008

(54) CIRCUIT ARRANGEMENT AND METHOD FOR COMPENSATING FOR DISTURBANCES IN A SIGNAL GENERATED BY MEANS OF DISCRETE MULTITONE MODULATION

(75) Inventor: Heinrich Schenk, Munich (DE)

(73) Assignee: Infineon Technologies AG, Munich (DE)

( * ) Notice: Subject to any disclaimer, the term of this patent is extended or adjusted under 35 U.S.C. 154(b) by 850 days.

(21) Appl. No.: 10/656,383

(22) Filed: Sep. 5, 2003

(65) Prior Publication Data
US 2004/0083254 A1    Apr. 29, 2004

(30) Foreign Application Priority Data
Sep. 27, 2002  (DE) ................. 102 45 282

(51) Int. Cl.
*H04K 1/10* (2006.01)
(52) U.S. Cl. .................................. 375/260
(58) Field of Classification Search ............ 375/260, 375/267, 232, 350
See application file for complete search history.

(56) References Cited

U.S. PATENT DOCUMENTS 6,647,076 B1 * 11/2003 Schenk et al. ............ 375/346
2006/0083325 A1 * 4/2006 Schenk ..................... 375/260

FOREIGN PATENT DOCUMENTS

| EP | 0967763 | 12/1999 |
|---|---|---|
| JP | 2002/531008 | 9/2002 |
| WO | WO 97/40609 | 10/1997 |
| WO | WO 00/31937 | 6/2000 |

OTHER PUBLICATIONS

Martin et al., "Blind, Adaptive, Per Tone Equalization for Multicarrier Receivers," 2002 Conference on Information Sciences and Systems, Princeton University, Mar. 20-22, 2002.
Toeltsch, et al., "Equalization of OFDM-Systems by Interference Cancellation Techniques, " Institut für Nachrichtentechnik und Hochfrequenztechnik, Technische Universität Wien, Austria, 2001.
Van Acker, et al., "Per Tone Equalization for DMT-Based Systems," IEEE Transactions on Communications, vol. 49, No. 1, Jan. 2001.
English translation of Chinese Office Action which issued on May 26, 2006.

\* cited by examiner

*Primary Examiner*—Don N. Vo
(74) *Attorney, Agent, or Firm*—Jenkins, Wilson, Taylor & Hunt, P.A.

(57) ABSTRACT

A circuit arrangement for compensating for disturbances in a signal generated by means of discrete multitone modulation includes a multiplicity of adder circuits that are supplied with an error signal vector that is not used for transmitting data via the transmission channel. The multiplicity of adder circuits adds the error signal vector to at least one signal vector to generate an error-corrected signal vector. The circuit arrangement can also include at least one further multiplicity of adder circuits that are supplied with a further error signal vector, the at least one further multiplicity of adder circuits adding the respective further error signal vector to the at least one signal vector to generate a progressively error-corrected signal vector. The circuit arrangement further includes at least one multiplicity of multiplier circuits that precede the at least one multiplicity of adder circuits and multiply the respective error signal vector by adjustable coefficients.

26 Claims, 5 Drawing Sheets

CIRCUIT ARRANGEMENT AND METHOD FOR COMPENSATING FOR DISTURBANCES IN A SIGNAL GENERATED BY MEANS OF DISCRETE MULTITONE MODULATION

Circuit arrangement and method for compensating for disturbances in a signal generated by means of discrete multitone modulation

TECHNICAL FIELD

The invention relates to a circuit arrangement for compensating for disturbances in a signal generated by means of discrete multitone modulation and to a method for compensating for disturbances in a signal generated by means of discrete multitone modulation.

BACKGROUND ART

Discrete multitone modulation (DMT)—also multicarrier modulation—is a modulation method which is particularly suitable for transmitting data via linearly distorting channels. Compared with so-called single carrier methods such as, for example, amplitude modulation which has only one carrier frequency, a multiplicity of carrier frequencies are used in discrete multitone modulation. In this type of modulation, a signal is composed of many sinusoidal signals, each individual signal having one carrier frequency and being amplitude- and phase-modulated by quadrature amplitude modulation (QAM). This provides a multiplicity of quadrature amplitude modulated or QAM modulated signals. In this arrangement, a particular number of bits can be transmitted per carrier frequency. Due to the flexibility of the adaptation of the data rate or of the transmission spectrum to the transmission channel or the interference environment, advantages can be obtained compared with single carrier methods. Discrete multitone modulation is used, for example, for digital audio broadcasting (DAB) with the designation OFDM (Orthogonal Frequency Division Multiplex) and for transmitting data via telephone lines such as, e.g. in ADSL (Asymmetric Digital Subscriber Line).

In ADSL, data are transmitted with the aid of a DMT modulated signal from a switching center to a subscriber with analog connection via the telephone network. In this context, ETSI and ANSI standards specify that each carrier frequency has a bandwidth of approximately 4 kHz and transports a maximum of 15 bit/s/Hz. The actual number of bits/s/Hz can be different for each carrier frequency as a result of which the data rate and the transmission spectrum can be matched to the transmission channel.

A DMT transmission system has a coder which combines the bits of a serial digital data signal to be transmitted into blocks. Depending on the scaling of the QAM modulation, a complex number is allocated in each case to a particular number of bits in a block. A complex number represents a carrier frequency $f_i=i/T$, with $i=1, 2, \ldots, N/2$ of the discrete multitone modulation, all carrier frequencies $f_i$ being equidistantly distributed. T is the period of one block. The carrier frequencies represented by signal vectors are transformed into the time domain by means of an inverse Fourier transform (IFT), where they directly represent N samples of a DMT signal to be transmitted. The complex signal vectors can be thought of as complex amplitudes of cosinusoidal oscillations (real part) and sinusoidal oscillations (imaginary part) to be sent out within a block. If a power of 2 is selected for N, the inverse fast Fourier transform (IFFT) can be used for the transformation into the time domain, which greatly reduces the implementation effort.

After the inverse fast Fourier transform, a cyclic prefix is carried out, where the last M (M<N) samples are appended again to the start of a block. As a result, a periodic signal is simulated to a receiver when the recovery generated by a transmission channel has decayed after M samples in accordance with a time T·M/N. The amount of equalization required in the receiver can be greatly reduced by means of the cyclic prefix since, after the demodulation in the receiver, it is only necessary to multiply by the inverse transfer function of the transmission channel in order to eliminate the linear distortions of the transmission channel. This requires one complex or four real multiplications for each carrier frequency.

In ADSL, the transmission channel is a two-wire line (twin copper wire). In comparison with the length of a block, the two-wire line requires a large amount of time for the recovery, which requires a relatively large cyclic prefix. On the other hand, the additional transmission capacity needed by the cyclic prefix should be as low as possible. With a block length of N=512, a cyclic prefix of M=32 is specified for ADSL. However, the recovery of the two-wire line has not yet decayed after M=32 values. As a result, disturbances occur in the receiver which cannot be eliminated by an equalizer in the frequency domain.

Such disturbances can be reduced in the receiver with the aid of special signal processing measures. For this purpose, a time domain equalizer (TDEQ) is connected in front of a demodulator. The time domain equalizer is constructed as a digital transversal filter with adjustable coefficients. The function of the time domain equalizer consists in shortening the recovery of the transmission channel or, respectively, shortening the impulse response of the overall system which consists of a transmitter, the transmission channel and the time domain equalizer. Accordingly, the number of impulse response values of the digital transversal filter must be smaller than the number M of the samples of the cyclic prefix if possible. The design of such time domain equalizers can be found in Al-Dhahir, N., Cioffi, J. M., "Optimum Finite-Length Equalization for Multicarrier Transceivers", IEEE Trans. on Comm., Vol. 44, No. 1, January 1996. A disadvantage of such time domain equalizers is, however, the high additional circuit complexity which is due to the large number of coefficients (between 20 and 40 coefficients) exhibited by the digital transversal filter used as time domain equalizer. A further disadvantage of such time domain equalizers is the high computing effort, which is approximately 50 to 100 million multiplications per second with a filter length of 20 to 40 coefficients and is associated with correspondingly high circuit complexity. In addition, each coefficient must be adjusted for adapting the digital transversal filter.

FIG. 5 shows a circuit arrangement, described in DE 199 01 465, for compensating, at the receiver end, for disturbances in a signal generated by means of discrete multitone modulation. A serial/parallel converter 1 receives digital samples of a signal IN generated by means of discrete multitone modulation. The serial/parallel converter 1 forms blocks from the digital samples supplied, one block having a multiplicity of N parallel signals which are supplied to a demodulator 2, where N should be a power of 2.

The demodulator 2 is a fast Fourier transform demodulator which converts the multiplicity of N parallel signals supplied in the time domain into a multiplicity of n carrier frequencies $f_1$-fn in the frequency domain, each carrier frequency being used for quadrature amplitude modulation (QAM) in the discrete multitone modulation. Each carrier frequency has a signal vector $a_1$, $b_1$ to $a_n$, $b_n$. Each signal vector exhibits two elements which represent a real part and an imaginary part of a complex number. The amount and phase of the complex number are associated with the signal QAM-modulated under the carrier frequency. The respective carrier frequency is also called frequency channel or channel. In ADSL, for example, of 256 carrier frequencies which in each case are spaced apart by 4.3125 kHz, carrier frequencies 7 to 250, corresponding to a frequency spectrum of 30.1875 kHz to 1078.125 kHz are used for signal transmission and the frequency range below that up to 4 kHz is used for voice transmission.

Corresponding to the multiplicity of signal vectors or carrier frequencies, n frequency domain equalizers 3-1, ..., 3-n (FDEQ) are provided for equalizing the signal vectors $a_1$, $b_1$ to $a_n$, $b_n$. A frequency domain equalizer is used for the channel equalization of a signal vector. The frequency domain equalizer multiplies the input signal thereof by the respective inverse complex channel transfer function value. For this purpose, each frequency domain equalizer can be adapted to the transfer characteristic of the transmission channel which is specific to a carrier frequency. At the output of each frequency domain equalizer 3-1, ..., 3-n, an equalized signal vector $a_1'$, $b_1'$ to $a_n'$, $b_n'$ is in each case present.

Each frequency domain equalizer 3-1, ..., 3-n is in each case followed by a decision circuit 4-1 or 4-n, respectively. A decision circuit decides which signal state in the signal state space of the QAM-modulated carrier frequencies is allocated to a signal vector supplied. A signal state corresponds to a value-discrete signal vector $a_1''$, $b_1''$ to $a_n''$, $b_n''$ which has a value-discrete amplitude and a value-discrete phase. The decisive factor for a correct allocation of a signal vector to a value-discrete signal vector is a signal vector which is disturbed as little as possible by the transmission.

Each decision circuit 4-1, ..., 4-n is in each case followed by a decoder circuit 5-1 or 5-n, respectively. A decoder circuit decodes the binary signals OUT0 to OUTn, contained in the signal vector, from a supplied value-discrete signal vector $a_1''$, $b_1''$ to $a_n''$, $b_n''$.

An arbitrary equalized signal vector $a_1'$, $b_1'$ is used as the reference signal vector. The frequency channel allocated to the reference signal vector is, therefore, called the reference frequency channel. The reference signal vector of the reference frequency channel is converted into a value-discrete reference signal vector $a_1''$, $b_1''$ by the first decision circuit 4-1. The reference signal vector is used for correcting all other signal vectors. This is possible due to the mutual dependence of the individual signal vectors.

From the reference signal vector, an error signal vector is generated which is used for correcting all other signal vectors. For this purpose, the real part $a_1'$ and the value-discrete real part $a_1''$ of the reference signal vector are supplied to a first subtracting circuit 6 and subtracted from one another. At the output of the first subtracting circuit 6, a real part $\Delta a_1$ of a complex number is present which represents the error signal contained in the error signal vector $\Delta a_1$, $\Delta b_1$. The imaginary part $b_1'$ and the value-discrete imaginary part $b_1''$ of the reference signal vector are correspondingly supplied to a second subtracting circuit 7. At the output of the second subtracting circuit 7, an imaginary part $\Delta b_1$ of the complex number is present which represents the error signal contained in the error signal vector $\Delta a_1$, $\Delta b_1$. The formula for forming the elements of the error signal vector from the elements of the reference signal vector is:

$$\Delta a_1 = a_1' - a_1'' \text{ and } \Delta b_1 = b_1' - b_1''$$

However, the error signal vector $\Delta a_1$, $\Delta b_1$ is adapted to the signal vector to be corrected with the aid of coefficients and added for correction to the signal vector corresponding to a frequency channel to be corrected.

In the text which follows, this method is described with the example of an arbitrary frequency channel which corresponds to an equalized signal vector $a_n'$, $b_n'$. Each frequency channel is corrected apart from the frequency channel which exhibits the reference signal vector. The real part $\Delta a_1$ of the error signal vector is supplied to a first multiplier circuit 8 and, in parallel, to a second multiplier circuit 11. The first multiplier circuit 8 multiplies the real part $\Delta a_1$ of the error signal vector by a first coefficient $C_{aa}{}^n$. The second multiplier circuit 11 multiplies the real part $\Delta a_1$ of the error signal vector by a second coefficient $C_{ab}{}^n$. The imaginary part $\Delta b_1$ of the error signal vector is supplied to a third multiplier circuit 9 and, in parallel, to a fourth multiplier circuit 10. The third multiplier circuit 9 multiplies the imaginary part $\Delta b_1$ of the error signal vector by a third coefficient $C_{ba}{}^n$. The fourth multiplier circuit 10 multiplies the imaginary part $\Delta b_1$ of the error signal vector by a fourth coefficient $C_{bb}{}^n$.

The output signals of the first multiplier circuit 8 and of the third multiplier circuit 9 are supplied to a first adder circuit 12. A real part $a_n'$ of the equalized signal vector $a_n'$, $b_n'$ which is present at the output of a frequency domain equalizer 3-n is also supplied to the first adder circuit 12. The first adder circuit 12 adds the three supplied signals to an error-corrected real part $a_n^*$ of the signal vector. The output signals of the second multiplier circuit 11 and of the fourth multiplier circuit 10 are supplied to a second adder circuit 13. The second adder circuit 13 is also supplied with an imaginary part $b_n'$ of the equalized signal vector $a_n'$, $b_n'$, which is present at the output of the second frequency domain equalizer 3-n. At the output of the second adder circuit 13 which adds the three signals supplied, an error-corrected imaginary part $b_n^*$ of the signal vector is present.

The method described above can be expressed by the following formulae:

$$a_n^* = a_n' + C_{aa}{}^n \cdot \Delta a_1 + C_{ba}{}^n \cdot \Delta b_1$$

$$b_n^* = b_n' + C_{ab}{}^n \cdot \Delta a_1 + C_{bb}{}^n \cdot \Delta b_1$$

The error-corrected real part $a_n^*$ and the error-corrected imaginary part $b_n^*$ of the error-corrected signal vector $a_n^*$, $b_n^*$ are supplied to a second decision circuit 4-n which converts the error-corrected real part $a_n^*$ and the error-corrected imaginary part $b_n^*$ into a value-discrete real part $a_n''$ or, respectively, into a value-discrete imaginary part $b_n''$ of a value-discrete signal vector $a_n''$, $b_n''$. The value-discrete signal vector $a_n''$, $b_n''$ is supplied to a decoder circuit 5-n. The decoder circuit 5-n decodes the signal OUTn from the supplied signal vector.

In this method, for each signal vector apart from the reference signal vector, the error signal vector is weighted in accordance with the frequency channel to be corrected and added to the equalized signal vector associated with the frequency channel. The weighting coefficients $C_{aa}{}^n$, $C_{ba}{}^n$, $C_{ab}{}^n$ and $C_{bb}{}^n$ for weighting the error signal vector can be adjusted step by step by means of an iterative algorithm for error minimization such as, for example, the mean square error (MSE) algorithm.

$$C_{aa}{}^n(k) = C_{aa}{}^n(k-1) - g \cdot \Delta a_1(k) \cdot \Delta a_n(k)$$

$$C_{bb}{}^n(k) = C_{bb}{}^n(k-1) - g \cdot \Delta b_1(k) \cdot \Delta b_n(k)$$

$$C_{ab}{}^n(k) = C_{ab}{}^n(k-1) - g \cdot \Delta a_1(k) \cdot \Delta b_n(k)$$

$$C_{ba}{}^n(k) = C_{ba}{}^n(k-1) - g \cdot \Delta b_1(k) \cdot \Delta a_n(k) \quad (1)$$

k designates a discrete time and g specifies a correcting variable. To calculate the weighting coefficients $C_{aa}{}^n$, $C_{ba}{}^n$, $C_{ab}{}^n$ and $C_{bb}{}^n$ in accordance with equations (1), both the error signal vector $\Delta a_1$, $\Delta b_1$ of the reference signal vector and an error signal vector $\Delta a_n$, $\Delta b_n$ of the nth channel to be corrected are needed. The error signal vector $\Delta a_n$, $\Delta b_n$ of the nth channel to be corrected is then formed in accordance with the error signal vector of the reference frequency channel.

If a signal vector is only to be corrected in the lower frequency band, a simplified algorithm with symmetric weighting coefficients $C_{aa}{}^n$, $C_{ba}{}^n$, $C_{ab}{}^n$ and $C_{bb}{}^n$ is sufficient. This may be the case, for example, when a time domain equalizer preceding the demodulator 2 and the serial/parallel converter 1 is used. The demands on the time domain equalizer are then less than the demands on a time domain equalizer without disturbance compensation. In this case, the weighting coefficients $C_{aa}{}^n$, $C_{ba}{}^n$, $C_{ab}{}^n$ and $C_{bb}{}^n$ are then calculated as follows:

$$C_{bb}{}^n(k) = C_{aa}{}^n(k-1)$$

$$C_{ba}{}^n(k) = C_{ab}{}^n(k-1) \quad (2a)$$

Due to the symmetry of the weighting coefficients, the storage space required for storing the weighting coefficients is advantageously reduced. In this case, the algorithm for the adjustment is as follows:

$$C_{aa}{}^n(k) = C_{aa}{}^n(k-1) - g \cdot (\Delta a_1(k) \cdot \Delta a_n(k) + \Delta b_1(k) \cdot \Delta b_n(k))$$

$$C_{ab}{}^n(k) = C_{ab}{}^n(k-1) - g \cdot (\Delta a_1(k) \cdot \Delta b_n(k) - \Delta b_1(k) \cdot \Delta a_n(k)) \quad (2b)$$

To simplify the multiplication, the correcting variable g is selected as a power of $2^{-p}$. As a result, a simple shift register can be used for the multiplication by the correcting variable. A further simplification can be achieved by only using the sign for the real part $\Delta a_i$ and the imaginary part $\Delta b_i$ of an error signal vector (this also applies to the simplified algorithm according to equations (2b)). The multiplications within the brackets of equations (2b) are thus reduced to a one-bit operation.

One advantage of this method consists in the reduced implementation effort as the compensation must be carried out at the block clock rate of the FFT demodulator and not at the clock rate of the sampling frequency and, on the other hand, the coefficients can be adjusted in a simple manner.

An accurate analysis of the compensation method described above with reference to FIG. 5 shows, however, that a complete extinction of the error caused by the recovery of the transmission channel, using a reference frequency channel, is only possible under the following conditions:

1) The recovery must have decayed after one block of the FFT demodulator; and
2) It must be possible to describe the transmission channel including transmit and receive filters by a second-order transfer function or, respectively, it must be possible to describe the recovery by means of a second-order linear differential equation with constant coefficients.

Since the first condition is usually met but the second condition is usually not met, the error caused by the recovery also cannot be completely eliminated by means of the circuit arrangement of FIG. 5. A residual error remains. A disadvantage of the circuit arrangement of FIG. 5, therefore, consists in that, in systems with poor recovery, it may not be possible to compensate for the recovery with the necessary accuracy so that the method described above and the circuit arrangement described above can only be used to a limited extent in these cases.

A further disadvantage of the circuit arrangement of FIG. 5 consists in that the frequency channel of the reference signal vector, i.e. the reference frequency channel, cannot be used completely for data transmission since it is not compensated for. In addition, a wrong decision caused by the reference frequency channel can lead to a multiplication of errors within the FFT block considered.

A further disadvantage of the circuit arrangement of FIG. 5 consists in that its circuit is very complex.

SUMMARY OF THE INVENTION

It is the object of the present invention to provide a method for compensating for disturbances in a signal generated by means of discrete multitone modulation and a circuit arrangement for carrying out the method, which are simple and allow efficient and error-free data transmission.

This object is achieved by a circuit arrangement for compensating for disturbances in a signal generated by means of discrete multitone modulation as claimed in claim 1 or 11 and by a method for compensating for disturbances in a signal generated by means of discrete multitone modulation as claimed in claim 14 or 23.

The invention relates to a circuit arrangement for compensating for disturbances in a signal generated by means of discrete multitone modulation (DMT), the signal generated by means of discrete multitone modulation exhibiting in the frequency domain a multiplicity of carrier frequencies which are used for transmitting data via a transmission channel, and each carrier frequency exhibiting a signal vector, comprising a multiplicity of first adder circuits, the multiplicity of first adder circuits being supplied with a first error signal vector and the multiplicity of first adder circuits adding the first error signal vector to at least one first signal vector in order to generate an error-corrected first signal vector; and a multiplicity of first multiplier circuits which precede the multiplicity of first adder circuits and multiply the first error signal vector by adjustable coefficients, the first error signal vector being a signal vector of a carrier frequency which is not used for transmitting data via the transmission channel.

The subclaims contain advantageous developments and improvements of the circuit arrangement specified in claim 1 or 11 and of the method specified in claim 14 or 23.

According to a preferred development of the circuit arrangement, the first error signal vector is a signal vector of a carrier frequency which, in the frequency domain, is adjacent to a carrier frequency which is used for transmitting data via the transmission channel.

According to a further preferred development of the circuit arrangement, the first error signal vector is a signal vector of a carrier frequency which, in the frequency domain, immediately precedes a carrier frequency which is used for transmitting data via the transmission channel.

According to a further preferred development of the circuit arrangement, the circuit arrangement also comprises at least one further multiplicity of first adder circuits which follow the multiplicity of first adder circuits, the at least one further multiplicity of first adder circuits in each case being supplied with a further error signal vector and the at least one further multiplicity of first adder circuits adding the respective further error signal vector to the at least one signal vector in order to generate a progressively error-corrected signal vector; and at least one further multiplicity of first multiplier circuits which precede the at least one further multiplicity of first adder circuits and multiply the respective further error signal vector by adjustable coefficients.

According to a further preferred development of the circuit arrangement, the respective further error signal vector is a signal vector of a carrier frequency which is not used for transmitting data via the transmission channel.

According to a further preferred development of the circuit arrangement, the respective further error signal vector is in each case a previous version of a particular error signal vector.

According to a further preferred development of the circuit arrangement, the circuit arrangement also comprises at least one buffer circuit for storing a previous version of an error signal vector.

According to a further preferred development of the circuit arrangement, the circuit arrangement also comprises a decision circuit which maps the error-corrected first signal vector into a value-discrete first signal vector; and a subtracting circuit for forming a second error signal vector which subtracts the first signal vector and the value-discrete first signal vector from one another, the second error signal vector being used for generating an error-corrected second signal vector of a second signal vector of a carrier frequency which is immediately adjacent to the carrier frequency of the first signal vector.

According to a further preferred development of the circuit arrangement, the circuit arrangement also comprises a multiplicity of second adder circuits, the multiplicity of second adder circuits being supplied with the second error signal vector and the multiplicity of second adder circuits adding the second error signal vector to the second signal vector in order to generate the error-corrected second signal vector; and a multiplicity of second multiplier circuits which precede the multiplicity of second adder circuits and multiply the second error signal vector by adjustable coefficients.

According to a further preferred development of the circuit arrangement, the circuit arrangement also comprises a further decision circuit which maps the error-corrected second signal vector into a value-discrete second signal vector; and a further subtracting circuit for forming a third error signal vector which subtracts the second signal vector and the value-discrete second signal vector from one another, the third error signal vector being used for generating an error-corrected third signal vector of a third signal vector of a carrier frequency which is immediately adjacent to the carrier frequency of the second signal vector.

The invention also relates to a circuit arrangement for compensating for disturbances in a signal generated by means of discrete multitone modulation (DMT), the signal generated by means of discrete multitone modulation exhibiting in the frequency domain a multiplicity of carrier frequencies which are used for transmitting data via a transmission channel, and each carrier frequency exhibiting a signal vector, comprising decision circuits which are in each case supplied with a reference signal vector and which map the respective reference signal vector into a respective value-discrete reference signal vector; subtracting circuits for forming a respective error signal vector which subtract the respective reference signal vector and the respective value-discrete reference signal vector from one another; groups of first adder circuits, each group of first adder circuits in each case being supplied with an error signal vector and the groups of first adder circuits adding the respective error signal vector to at least one signal vector in order to generate a progressively error-corrected signal vector; and groups of first multiplier circuits which in each case precede a group of first adder circuits and multiply the respective error signal vector by adjustable coefficients.

According to a further preferred development of the circuit arrangements, the adjustable coefficients can be adjusted by means of a correcting variable.

According to a further preferred development of the circuit arrangements, a power of 2 is selected for the correcting variable.

The invention also relates to a method for compensating for disturbances in a signal generated by means of discrete multitone modulation (DMT), the signal generated by means of discrete multitone modulation exhibiting in the frequency domain a multiplicity of carrier frequencies which are used for transmitting data via a transmission channel, and each carrier frequency exhibiting a signal vector, comprising the steps of multiplying at least one error signal vector by adjustable coefficients; and adding the at least one error signal vector multiplied by the adjustable coefficients to at least one signal vector in order to generate an error-corrected signal vector, the at least one error signal vector being a signal vector of a carrier frequency which is not used for transmitting data via the transmission channel.

According to a preferred development of the method, the first error signal vector is a signal vector of a carrier frequency which, in the frequency domain, is adjacent to a carrier frequency which is used for transmitting data via the transmission channel.

According to a further preferred development of the method, the first error signal vector is a signal vector of a carrier frequency which, in the frequency domain, immediately precedes a carrier frequency which is used for transmitting data via the transmission channel.

According to a further preferred development of the method, the method also comprises the steps of multiplying a respective further error signal vector by adjustable coefficients; and of adding the respective further error signal vector multiplied by the adjustable coefficients to the at least one signal vector in order to generate a progressively error-corrected signal vector.

According to a further preferred development of the method, the respective further error signal vector is in each case a signal vector of a carrier frequency which is not used for transmitting data via the transmission channel.

According to a further preferred development of the method, the respective further error signal vector is in each case a previous version of a particular error signal vector.

According to a further preferred development of the method, the method also comprises the steps of mapping the error-corrected first signal vector into a value-discrete first signal vector; and of subtracting the first signal vector and the value-discrete first signal vector from one another in order to form a second error signal vector, the second error signal vector being used for generating an error-corrected second signal vector of a second signal vector of a carrier frequency which is immediately adjacent to the carrier frequency of the first signal vector.

According to a further preferred development of the method, the method also comprises the steps of multiplying the second error signal vector by adjustable coefficients; and of adding the second error signal vector multiplied by the adjustable coefficients to the second signal vector in order to generate the error-corrected second signal vector.

According to a further preferred development of the method, the method also comprises the steps of mapping the error-corrected second signal vector into a value-discrete second signal vector; and of subtracting the second signal vector and the value-discrete second signal vector from one another in order to form a third error signal vector, the third error signal vector being used for generating an error-corrected third signal vector of a third signal vector of a carrier frequency which is immediately adjacent to the carrier frequency of the second signal vector.

The invention also relates to a method for compensating for disturbances in a signal generated by means of discrete multitone modulation (DMT), the signal generated by means of discrete multitone modulation exhibiting in the frequency domain a multiplicity of carrier frequencies which are used for transmitting data via a transmission channel, and each carrier frequency exhibiting a signal vector, comprising the steps of mapping a respective reference signal vector into a respective value-discrete reference signal vector; of subtracting the respective reference signal vector and the respective value-discrete reference signal vector from one another in order to form a respective error signal vector; of multiplying the respective error signal vector by adjustable coefficients; and of adding the respective error signal vector multiplied by the adjustable coefficients to at least one signal vector in order to generate a progressively error-corrected signal vector.

According to a further preferred development of the method, the adjustable coefficients can be adjusted by means of a correcting variable.

According to a further preferred development of the method, a power of 2 is selected for the correcting variable.

One advantage of the present invention consists in that the effort to implement the circuit arrangements described and the method described, measured in number of multiplications per second for the correction and for the adaptive adjustment, is much less than in the case of the methods and circuit arrangements presently used.

A further advantage of the present invention consists in that, using the circuit arrangements described here, it is always possible to reduce the residual error of the output signals, which is caused by the recovery of a transmission link (transmit and receive filters and transmission channel), to a predetermined measure. Depending on the characteristics of the transmission link, a circuit arrangement can be selected by means of which a sufficiently small residual error can be achieved.

A further advantage of the present invention consists in that, by using error signal vectors with carrier frequencies which are not used for transmitting data via the transmission channel, it is not necessary to use decision circuits and subtracting circuits, otherwise necessary, for generating error signal vectors from reference signal vectors with carrier frequencies which are used for transmitting data via the transmission channel. This considerably simplifies the circuit arrangement and considerably reduces the expenditure for producing it.

BRIEF DESCRIPTION OF THE DRAWINGS

In the text which follows, preferred exemplary embodiments of the present invention are explained in greater detail with reference to the attached drawings, in which.

In subscriber line technology such as, e.g., ADSL, not all frequency channels used for the FFT demodulation are also actually used for the data transmission. To be able to transmit also an analog voice signal at the same time as the digital data signal via the same line, the first five to six frequency channels remain unused in ADSL. Since, on the other hand, the signal vector of basically any frequency channel can be used as reference signal vector for compensating for the recovery, the signal vector of a frequency channel not used for data transmission can also be used. In this case, the error signal vector does not need to be generated by means of a decision circuit, either. The signal vector at the output of an FFT demodulator for the reference frequency channel not used for the data transmission can be directly used for compensating for the error component due to the recovery.

Figure 1:
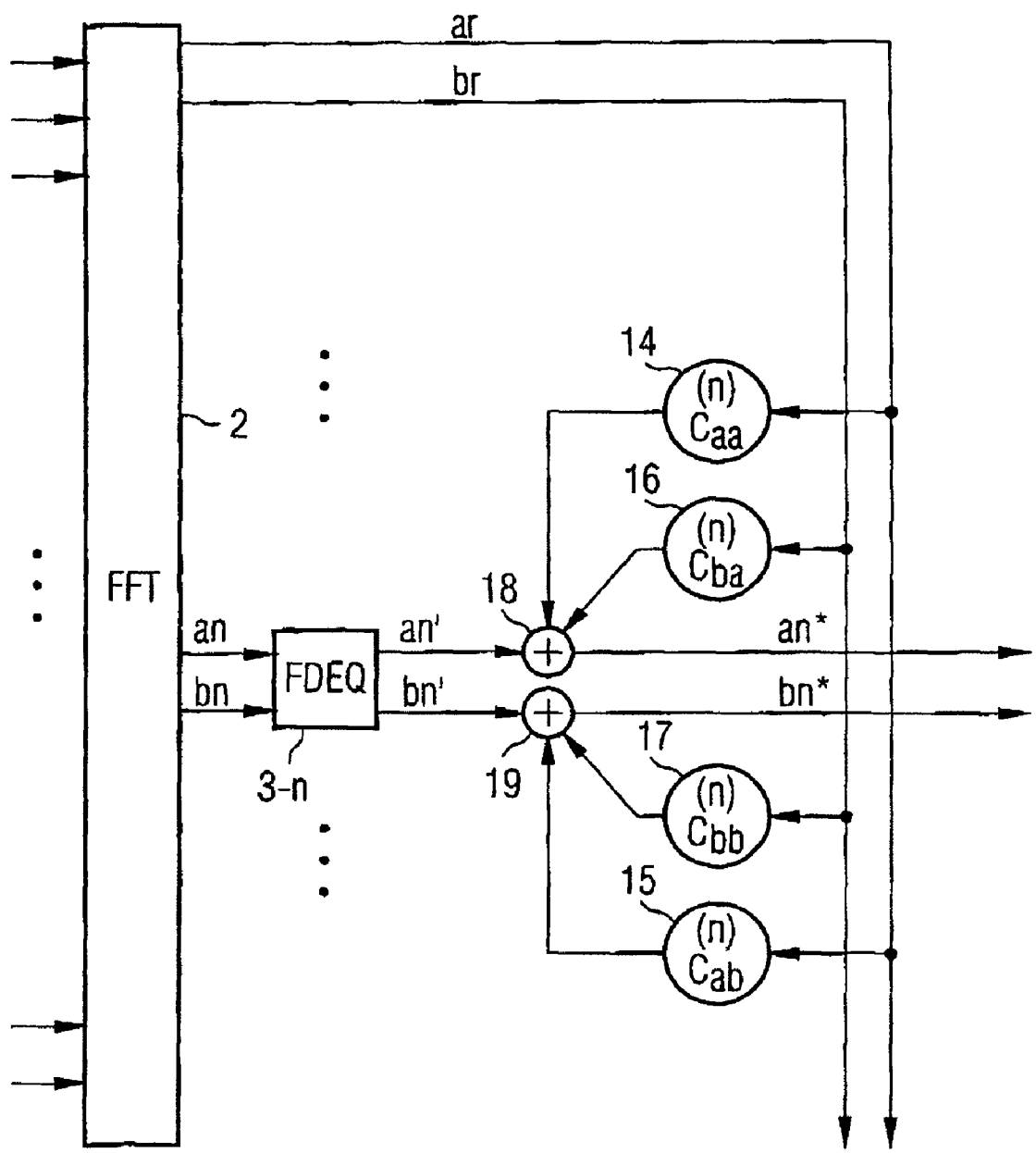
FIG. 1 shows an exemplary embodiment of a circuit arrangement for compensating for disturbances in a signal generated by means of discrete multitone modulation, according to the present invention.

FIG. 1 shows a first exemplary embodiment of a circuit arrangement according to the invention. The circuit arrangement has a demodulator 2 which is supplied with blocks consisting of a multiplicity of N parallel signals, by a serial/parallel converter (not shown). The demodulator 2 is preferably a fast Fourier transform demodulator which converts the multiplicity of N parallel signals supplied in the time domain into a multiplicity of N carrier frequencies $f_1$-$f_n$ in the frequency domain, each carrier frequency being used for quadrature amplitude modulation (QAM) in the discrete multitone modulation. Each carrier frequency exhibits a signal vector, only the signal vector $a_n$, $b_n$ for the nth frequency channel being shown here which in this case is a frequency channel or user frequency channel used for the data transmission. Each signal vector exhibits two elements which represent a real part and an imaginary part of a complex number. The amount and phase of the complex number are associated with the signal modulated onto the carrier frequency with QAM.

Following the demodulator 2, a frequency domain equalizer is arranged for each frequency channel. In this case, only the frequency domain equalizer 3-n for the nth frequency channel is shown which equalizes the signal vector $a_n$, $b_n$ and generates from it an equalized signal vector $a_n'$, $b_n'$.

In the circuit arrangement shown in FIG. 1, a signal vector of a frequency channel which is not used for transmitting data is used as reference signal vector $a_r$, $b_r$ and used for correcting all remaining equalized signal vectors. The reference signal vector $a_r$, $b_r$ is adapted to the signal vector to be corrected with the aid of coefficients and added to this signal vector for correction. In FIG. 1, this is described with the example of the nth frequency channel. Each frequency channel apart from the frequency channel which exhibits the reference signal vector is corrected. To correct the equalized signal vector $a_n'$, $b_n'$, the real part $a_r$ of the reference signal vector is supplied to a first multiplier circuit 14 and, in parallel, to a second multiplier circuit 15. The first multiplier circuit 14 multiplies the real part $a_r$ of the reference signal vector $a_r$, $b_r$ by a first coefficient $C_{aa}^{(n)}$. The second multiplier circuit 15 multiplies the real part $a_r$ of the reference signal vector $a_r$, $b_r$ by a second coefficient $C_{ab}^{(n)}$. The imaginary part $b_r$ of the reference signal vector is supplied to a third multiplier circuit 16 and, in parallel, to a fourth multiplier circuit 17. The third multiplier circuit 16 multiplies the imaginary part $b_r$ of the reference signal vector $a_r$, $b_r$ by a third coefficient $C_{ba}^{(n)}$. The fourth multiplier circuit 17 multiplies the imaginary part $b_r$ of the reference signal vector $a_r$, $b_r$ by a further coefficient $C_{bb}^{(n)}$.

The output signals of the first multiplier circuit 14 and of the third multiplier circuit 16 are supplied to a first adder circuit 18. The real part $a_n'$ of the equalized signal vector, which is present at the output of the frequency domain equalizer 3-n, is also supplied to the first adder circuit 18. The first adder circuit 18 adds the three signals supplied to an error-corrected real part $a_n^*$ of an error-corrected signal vector. The output signals of the second multiplier circuit 15 and of the fourth multiplier circuit 17 are supplied to a second adder circuit 19. The second adder circuit 19 is also supplied with an imaginary part $b_n'$ of the equalized signal vector which is present at the output of the frequency domain equalizer 3-n. At the output of the second adder circuit 19 which adds the three signals supplied, an error-corrected imaginary part $b_n^*$ of the error-corrected signal vector is present. The error-corrected real part $a_n^*$ and the error-corrected imaginary part $b_n^*$ of the error-corrected signal vector are then supplied to a decoder circuit (not shown).

An accurate analysis shows that for a transmission system which can be exactly described with an nth-order transfer function and the recovery of which has completely decayed after one block of the FFT demodulator, exactly n/2 reference frequency channels are required for compensating for the recovery. A second-order transfer function (n=2), therefore, requires one reference frequency channel, a fourth-order transfer function (n=4) requires two reference frequency channels and a sixth-order transfer function (n=6) requires three reference frequency channels etc. Increasing the number of reference frequency channels thus makes it possible to further reduce the remaining residual error caused by the recovery of the transmission channel in a real transmission system.

Figure 2:
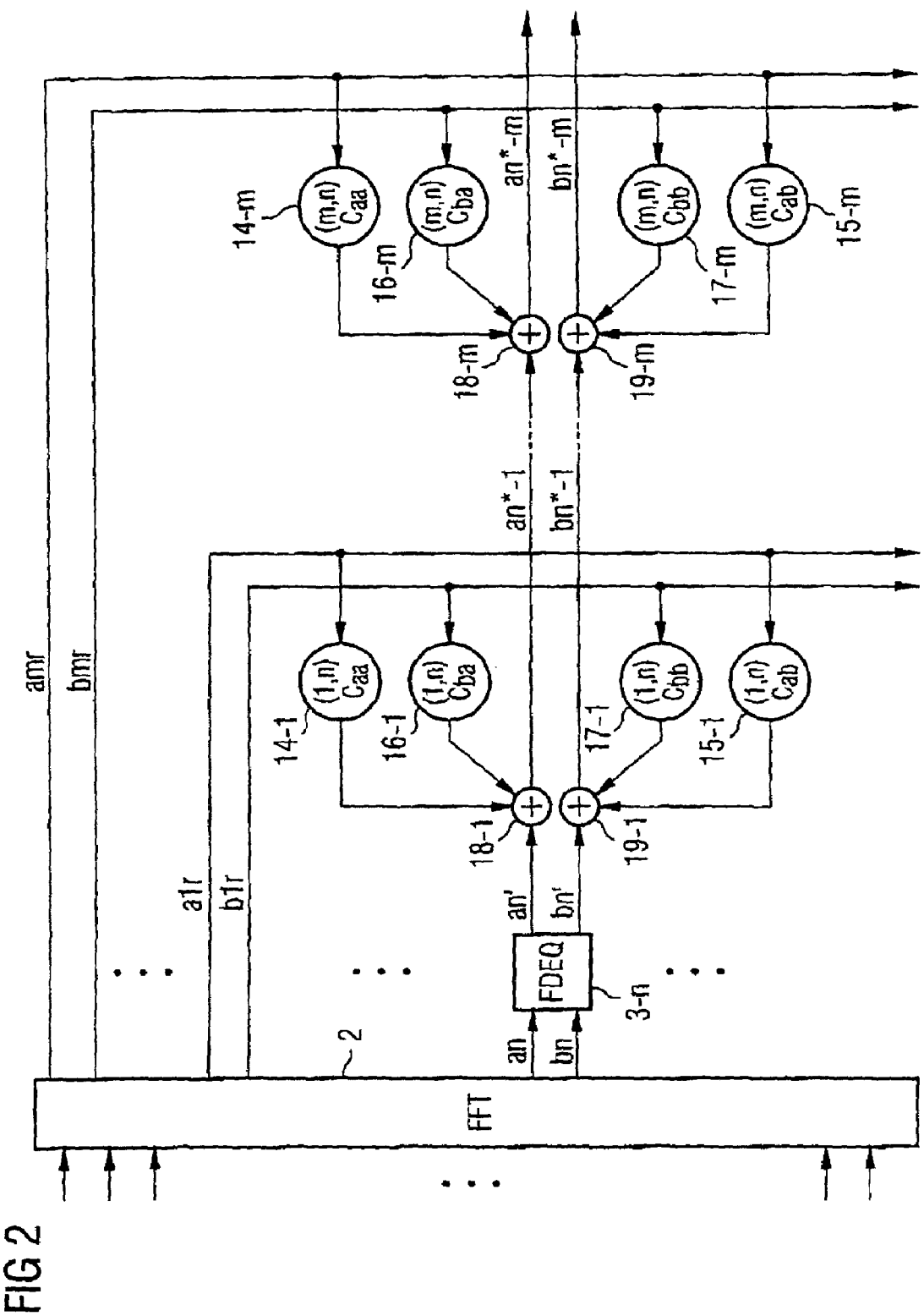
FIG. 2 shows a further exemplary embodiment of a circuit arrangement according to the present invention.

FIG. 2 shows a second exemplary embodiment of a circuit arrangement according to the invention. In the circuit arrangement shown, m reference frequency channels, instead of one reference frequency channel, are used for the correction of an arbitrary nth frequency channel, none of the reference frequency channels being used for the data transmission. The carrier frequencies of the reference frequency channels, generated by the demodulator 2, exhibit reference signal vectors $a_{1r}$, $b_{1r}$ to $a_{mr}$, $b_{mr}$. As in the exemplary embodiment of FIG. 1, the m real parts $a_{1r}$ to $a_{mr}$ of the respective reference signal vectors $a_{1r}$, $b_{1r}$ to $a_{mr}$, $b_{mr}$ are in each case supplied to a first multiplier circuit 14-1 to 14-m and in each case to a second multiplier circuit 15-1 to 15-m. Each first multiplier circuit 14-1 to 14-m multiplies the real part $a_{1r}$ to $a_{mr}$ of the respective reference signal vector by a respective associated first coefficient $C_{aa}^{(1,n)}$ to $C_{aa}^{(m,n)}$, and each second multiplier circuit 15-1 to 15-m multiplies the imaginary part $b_{1r}$ to $b_{mr}$ of the respective reference signal vector by a respective associated second coefficient $C_{ab}^{(1,n)}$ to $C_{ab}^{(m,n)}$. The m imaginary parts $b_{1r}$ to $b_{mr}$ of the respective reference signal vectors $a_{1r}$, $b_{1r}$ to $a_{mr}$, $b_{mr}$ are in each case supplied to a third multiplier circuit 16-1 to 16-m and in each case to a fourth multiplier circuit 17-1 to 17-m. Each third multiplier circuit 16-1 to 16-m multiplies the imaginary part $b_{1r}$ to $b_{mr}$ of the respective reference signal vector by a respective associated third coefficient $C_{ba}^{(1,n)}$ to $C_{ba}^{(m,n)}$, and each fourth multiplier circuit 17-n to 17-m multiplies the imaginary part $b_{1r}$ to $b_{mr}$ of the respective reference signal vector by a respective associated fourth coefficient $C_{bb}^{(1,n)}$ to $C_{bb}^{(m,n)}$.

The output signals of the respective first multiplier circuit 14-1 to 14-m and of the respective third multiplier circuit 16-1 to 16-m are supplied to a respective first adder circuit 18-1 to 18-m. On the basis of the real part $a_n'$ of the equalized signal vector of the nth user frequency channel which is present at the output of the frequency domain equalizer 3-n and is supplied to the adder circuit 18-1 of the first adder circuits 18-1 to 18-m, a progressively error-corrected real part $a_n^*$-1 to including $a_n^*$-m of the signal vector is supplied at each output of a first adder circuit 18-1 to 18-m.

The output signals of the respective second multiplier circuits 15-1 to 15-m and of the respective fourth multiplier circuit 17-1 to 17-m are supplied to a respective second adder circuit 19-1 to 19-m. On the basis of the imaginary part $b_n'$ of the equalized signal vector of the nth user channel, which is present at the output of the frequency domain equalizer 3-n and is supplied to the adder circuit 19-1 of the second adder circuits 19-1 to 19-m, a progressively error-corrected imaginary part $b_n^*$-1 to $b_n^*$-m of the signal vector is supplied at each output of a second adder circuit 19-1 to 19-m.

As an alternative to this exemplary embodiment shown in FIG. 2, reference frequency channels can also be used which are used for the data transmission at the same time. In this case, the corresponding error signals must be generated by means of a decision circuit.

As already mentioned above, the remaining residual error depends, apart from on the recovery, also on the choice of reference frequency channel. A further, more accurate analysis shows that the residual error is reduced during the compensation for the recovery of an arbitrary frequency channel if a reference frequency channel the frequency spacing of which is as small as possible with respect to this arbitrary frequency channel is used for the compensation. In this sense, it is advantageous if an adjacent frequency channel is always used as reference frequency channel for compensating for the recovery component of a user frequency channel.

Figure 3:
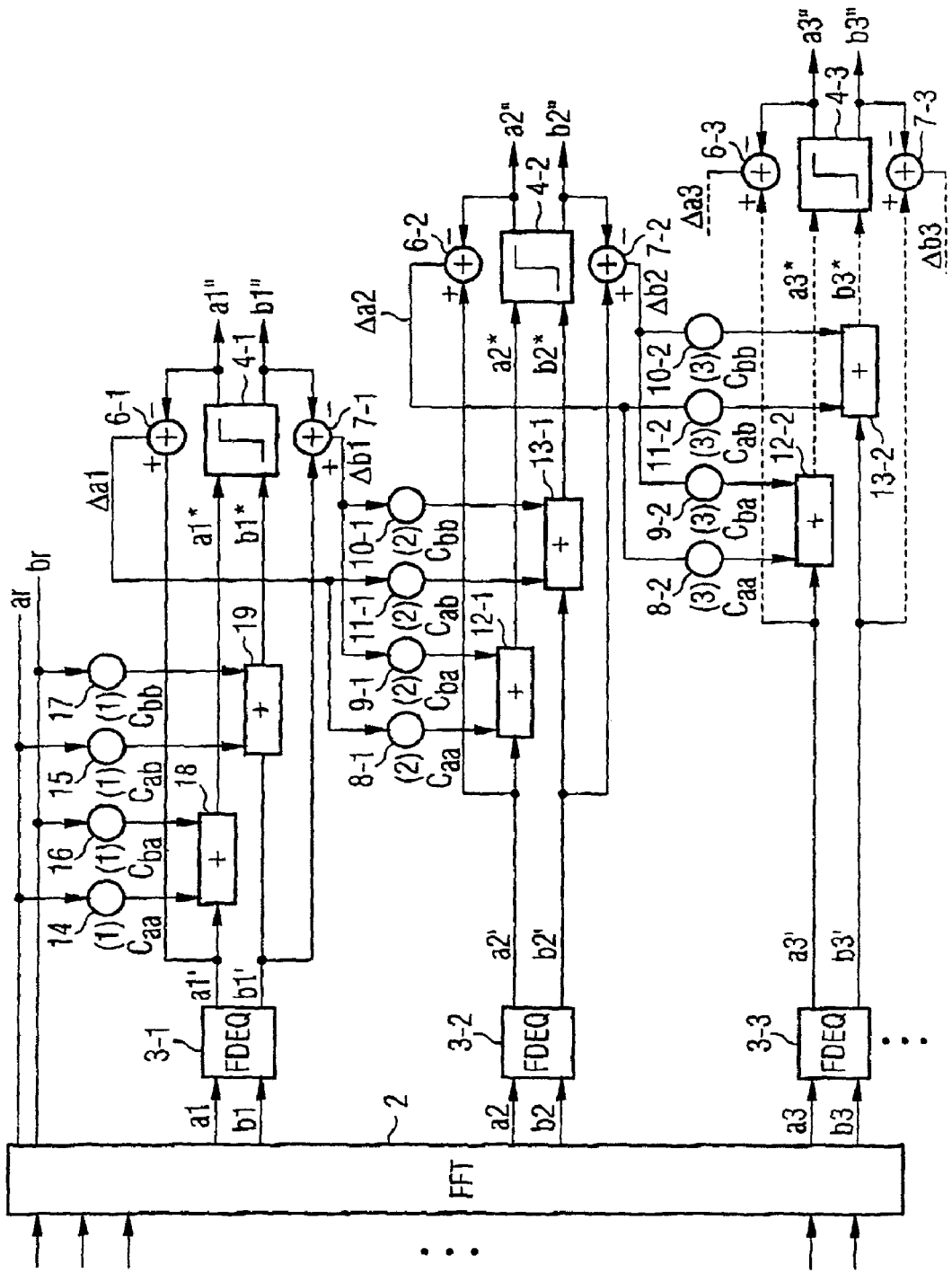
FIG. 3 shows a further exemplary embodiment of a circuit arrangement according to the present invention.

FIG. 3 shows a further exemplary embodiment of a circuit arrangement according to the invention. Following a demodulator 2, frequency domain equalizers 3-1, 3-2, 3-3 . . . are arranged which equalize the signal vectors $a_1$, $b_1$; $a_2$, $b_2$; $a_3$, $b_3$ . . . of user frequency channels. As an example, only three signal vectors and frequency domain equalizers are shown but an arbitrary number of signal vectors or user frequency channels can be processed. As can be seen in FIG. 3, a preceding frequency channel not used for data transmission is used for compensating for or correcting a first user frequency channel with the signal vectors $a_1$, $b_1$. This frequency channel used as reference frequency channel exhibits a signal vector $a_r$, $b_r$ and the error values of the latter can be picked up directly at the output of the demodulator 2. The real part $a_r$ of the reference signal vector ar, b r is supplied to a multiplier circuit 14 and, in parallel, to a multiplier circuit 15. The multiplier circuit 14 multiplies the real part $a_r$ of the reference signal vector $a_r$, $b_r$ by a coefficient $C_{aa}^{(1)}$.

The multiplier circuit 15 multiplies the real part $a_r$ of the reference signal vector $a_r$, $b_r$ by a coefficient $C_{ab}^{(1)}$. The imaginary part $b_r$ of the reference signal vector $a_r$, $b_r$ is supplied to a multiplier circuit 16 and, in parallel, to a multiplier circuit 17. The multiplier circuit 16 multiplies the imaginary part $b_r$ of the reference signal vector $a_r$, $b_r$ by a coefficient $C_{ba}^{(1)}$, and the multiplier circuit 17 multiplies the imaginary part $b_r$ of the reference signal vector $a_r$, $b_r$ by a coefficient $C_{bb}^{(1)}$.

Output signals of the multiplier circuit 14 and of the multiplier circuit 16 are supplied to an adder circuit 18. A real part $a_1'$ of the equalized signal vector of the first user frequency channel which is present at the output of the frequency domain equalizer 3-1 is also supplied to the adder circuit 18. The adder circuit 18 adds the three signals supplied to an error-corrected real part $a_1^*$ of an error-corrected signal vector. Output signals of the multiplier circuit 15 and of the multiplier circuit 17 are supplied to an adder circuit 19. An imaginary part $b_1'$ of the signal vector of the user frequency channel which is present at the output of the frequency domain equalizer 3-1 is also supplied to the adder circuit 19. The adder circuit 19 adds the three signals supplied to an error-corrected imaginary part $b_1^*$ of the error-corrected signal vector. The error-corrected signal vector $a_1^*$, $b_1^*$ is then converted into a value-discrete signal vector $a_1''$, $b_1''$ by a first decision circuit 4-1.

The first user frequency channel with the value-discrete signal vector $a_1''$, $b_1''$ is then used as reference frequency channel for the correction of a second adjacent user frequency channel. The second user frequency channel exhibits a signal vector $a_2$, $b_2$. From the value-discrete signal vector $a_1''$, $b_1''$ and the equalized signal vector $a_1'$, $b_1'$, an error signal vector is generated which is used for correcting the equalized signal vector $a_2'$, $b_2'$ of the second user frequency channel. For this purpose, the real part $a_1'$ of the equalized signal vector $a_1'$, $b_1'$ and the value-discrete real part $a_1''$ of the signal vector are supplied to a first subtracting circuit 6-1 and subtracted from one another. At an output of the first subtracting circuit 6-1, a real part $\Delta a_1$ of a complex number is present which represents the error signal contained in the error signal vector $\Delta a_1$, $\Delta b_1$. The imaginary part $b_1'$ of the equalized signal vector $a_1'$, $b_1'$ and the value-discrete imaginary part $b_1''$ of the signal vector are correspondingly supplied to a second subtracting circuit 7-1. At an output of the second subtracting circuit 7-1, an imaginary part $\Delta b_1$ of the complex number is present which represents the error signal contained in the error signal vector $\Delta a_1$, $\Delta b_1$. The real part $\Delta a_1$ of the error signal vector is supplied to a multiplier circuit 8-1 and, in parallel, to a multiplier circuit 11-1. The multiplier circuit 8-1 multiplies the real part $\Delta a_1$ of the error signal vector by a coefficient $C_{aa}^{(2)}$. The multiplier circuit 11-1 multiplies the real part $\Delta a_1$ of the error signal vector by a coefficient $C_{ab}^{(2)}$. The imaginary part $\Delta b_1$ of the error signal vector is supplied to a multiplier circuit 9-1 and, in parallel, to a multiplier circuit 10-1. The multiplier circuit 9-1 multiplies the imaginary part $\Delta b_1$ of the error signal vector by a coefficient $C_{ba}^{(2)}$. The multiplier circuit 10-1 multiplies the imaginary part $\Delta b_1$ of the error signal vector by a coefficient $C_{bb}^{(2)}$.

Output signals of the multiplier circuit 8-1 and of the multiplier circuit 9-1 are supplied to an adder circuit 12-1. The real part $a_2'$ of the equalized signal vector of the second user frequency channel, which is present at an output of the frequency domain equalizer 3-2, is also supplied to the adder circuit 12-1. The adder circuit 12-1 adds the three signals supplied to an error-corrected real part $a_2^*$ of the error-corrected signal vector. Output signals of the multiplier circuit 11-1 and of the multiplier circuit 10-1 are supplied to an adder circuit 13-1. The adder circuit 13-1 is also supplied with an imaginary part $b_2'$ of the equalized signal vector of the second user frequency channel which is present at the output of the frequency domain equalizer 3-2. At an output of the adder circuit 13-1 which adds the three signals supplied, an error-corrected imaginary part $b_2^*$ of the error-corrected signal vector is present. The error-corrected signal vector $a_2^*$, $b_2^*$ is then converted into a value-discrete signal vector $a_2''$, $b_2''$ by a decision circuit 4-2.

The second user channel with the value-discrete signal vector $a_2''$, $b_2''$ is then used as reference frequency channel for correcting an adjacent third user frequency channel. The third user frequency channel exhibits a signal vector $a_3$, $b_3$. From the value-discrete signal vector $a_2''$, $b_2''$ and the equalized signal vector $a_2'$, $b_2'$ of the second user frequency channel, an error signal vector is generated which is used for correcting the signal vector of the third user frequency channel.

For this purpose, the real part $a_2'$ of the equalized signal vector $a_2'$, $b_2'$ and the value-discrete real part $a_2''$ of the signal vector are supplied to a subtracting circuit 6-1 and subtracted from one another. At an output of the subtracting circuit 6-2, a real part $\Delta a_2$ of a complex number is present which represents the error signal contained in the error signal vector $\Delta a_2$, $\Delta b_2$. The imaginary part $b_2'$ of the equalized signal vector $a_2'$, $b_2'$ and the value-discrete imaginary part $b_2''$ of the signal vector are correspondingly supplied to a second subtracting circuit 7-2. At the output of the second subtracting circuit 7-2, an imaginary part $\Delta b_2$ of the complex number is present which represents the error signal contained in the error signal vector $\Delta a_2$, $\Delta b_2$. The real part $\Delta a_2$ of the error signal vector is supplied to a multiplier circuit 8-2 and, in parallel, to a multiplier circuit 11-2. The multiplier circuit 8-2 multiplies the real part $\Delta a_2$ of the error signal vector by a coefficient $C_{aa}^{(3)}$. The multiplier circuit 11-2 multiplies the real part $\Delta a_2$ of the error signal vector by a coefficient $C_{ab}^{(3)}$. The imaginary part $\Delta b_2$ of the error signal vector is supplied to a multiplier circuit 11-2 and, in parallel, to a multiplier circuit 10-2. The multiplier circuit 11-2 multiplies the imaginary part $\Delta b_2$ of the error signal vector by a coefficient $C_{ba}^{(3)}$. The multiplier circuit 10-2 multiplies the imaginary part $\Delta b_2$ of the error signal vector by a coefficient $C_{bb}^{(3)}$.

Output signals of the multiplier circuit 8-2 and of the multiplier circuit 9-2 are supplied to an adder circuit 12-2. The real part $a_3'$ of the equalized signal vector of the third user frequency signal, which is present at the output of the frequency domain equalizer 3-3, is also supplied to the adder circuit 12-2. The adder circuit 12-2 adds the three signals supplied to an error-corrected real part $a_3^*$ of the error-corrected signal vector. Output signals of the multiplier circuit 11-2 and of the multiplier circuit 10-2 are supplied to an adder circuit 13-2. The adder circuit 13-2 is also supplied with an imaginary part $b_3'$ of the equalized signal vector of the third user frequency channel, which is present at the output of the frequency domain equalizer 3-3. At the output of the adder circuit 13-2, which adds the three signals supplied, an error-corrected imaginary part $b_3^*$ of the error-corrected signal vector is present.

The adder circuits 12-2 and 13-2 are followed by a further decision circuit 4-3 for generating a value-discrete signal vector $a_3''$, $b_3''$ from the error-corrected signal vector $a_3^*$, $b_3^*$. In continuation, subtracting circuits 6-3 and 7-3, which generate an error signal vector $\Delta a_3$, $\Delta b_3$ from the equalized third signal vector $a_3'$, $b_3'$ and the value-discrete signal vector $a_3''$, $b_3''$, can be provided for the correction of a fourth user frequency channel with the third user frequency channel as reference frequency channel. This can be continued for an arbitrary number of user frequency channels. It is always the channel n-1 which is used as reference frequency channel for channel n.

The circuit arrangements according to FIGS. 1, 2 and 3 represent basic structures from which other structures can be derived. Thus, e.g. an equalizer structure can be specified in the case of which the last two frequency channels not yet used for data transmission are used as reference frequency channels for the first 8 user frequency channels and the eighth user frequency channel is used as the reference frequency channel for the remaining user frequency channels. Thus, a circuit arrangement can be specified which is optimum with respect to the smallest possible residual error.

As already explained, the circuit arrangements described here can only be used for equalization if the recovery has decayed within one block supplied by the FFT demodulator (FFT block). This is usually the case. For transmission systems with recoveries which have not decayed within one FFT block, e.g. due to filters in the transmitter and/or receiver which have very steep filter slopes, the circuit arrangements described in FIGS. 1, 2 and 3 can be expanded and used also for equalizing such systems. To compensate for the recovery error, the reference channel errors of the preceding FFT blocks must then be used in addition to the reference channel error of the current FFT block.

Figure 4:
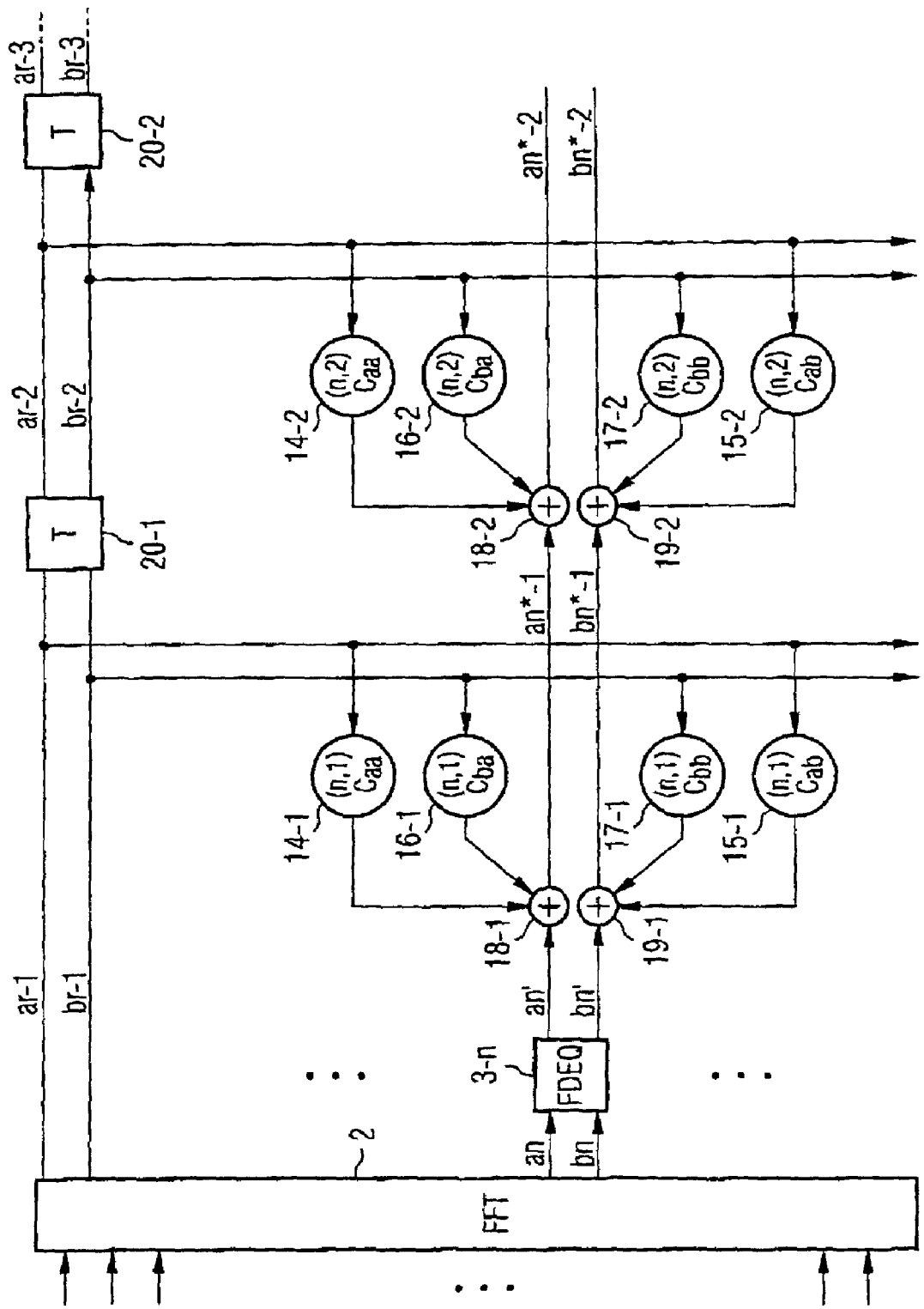
FIG. 4 shows a further exemplary embodiment of a circuit arrangement according to the present invention.

FIG. 4 shows a further exemplary embodiment of a circuit arrangement according to the invention in which the error of the current FFT block and the errors of the preceding FFT blocks are used for error compensation. With respect to the reference frequency channels used, the circuit arrangement according to FIG. 4 corresponds to the circuit arrangement according to FIG. 1. The circuit arrangements according to FIGS. 2 and 3 can also be expanded in such a manner that not only the error of the current FFT block but also the errors of the preceding FFT blocks are used for the compensation. A separate representation of such circuit arrangements is omitted in the present text, however.

The exemplary embodiment is shown for an nth user channel. To store preceding signal vectors $a_r$-1, $b_r$-1; $a_r$-2, $b_r$-2; $a_r$-3, $b_r$-3; ... of the reference frequency channel which is not used for data transmission, buffer circuits or timing sections 20-1, 20-2, ... are provided. The real part and the imaginary part of the current signal vector $a_r$-1, $b_r$-1 and of the preceding signal vectors $a_r$-2, $b_r$-2; $a_r$-3, $b_r$-3; ... of the reference frequency channel are supplied to multiplier circuits 14 to 17 with coefficients $C_{aa}^{(n,1)}$, $C_{ba}^{(n,1)}$, $C_{bb}^{(n,1)}$, $C_{ab}^{(n,1)}$, $C_{aa}^{(n,2)}$, $C_{ba}^{(n,2)}$, $C_{bb}^{(n,2)}$ and $C_{ab}^{(n,2)}$ etc. and then to adder circuits 18-1, 18-2 and 19-1, 19-2 in order to generate successive progressively error-corrected signal vectors $a_n$*-1, $b_n$*-1; $a_n$*-2, $b_n$*-2; ... from the equalized signal vector $a_n'$, $b_n'$ of the nth user frequency channel.

Figure 5:
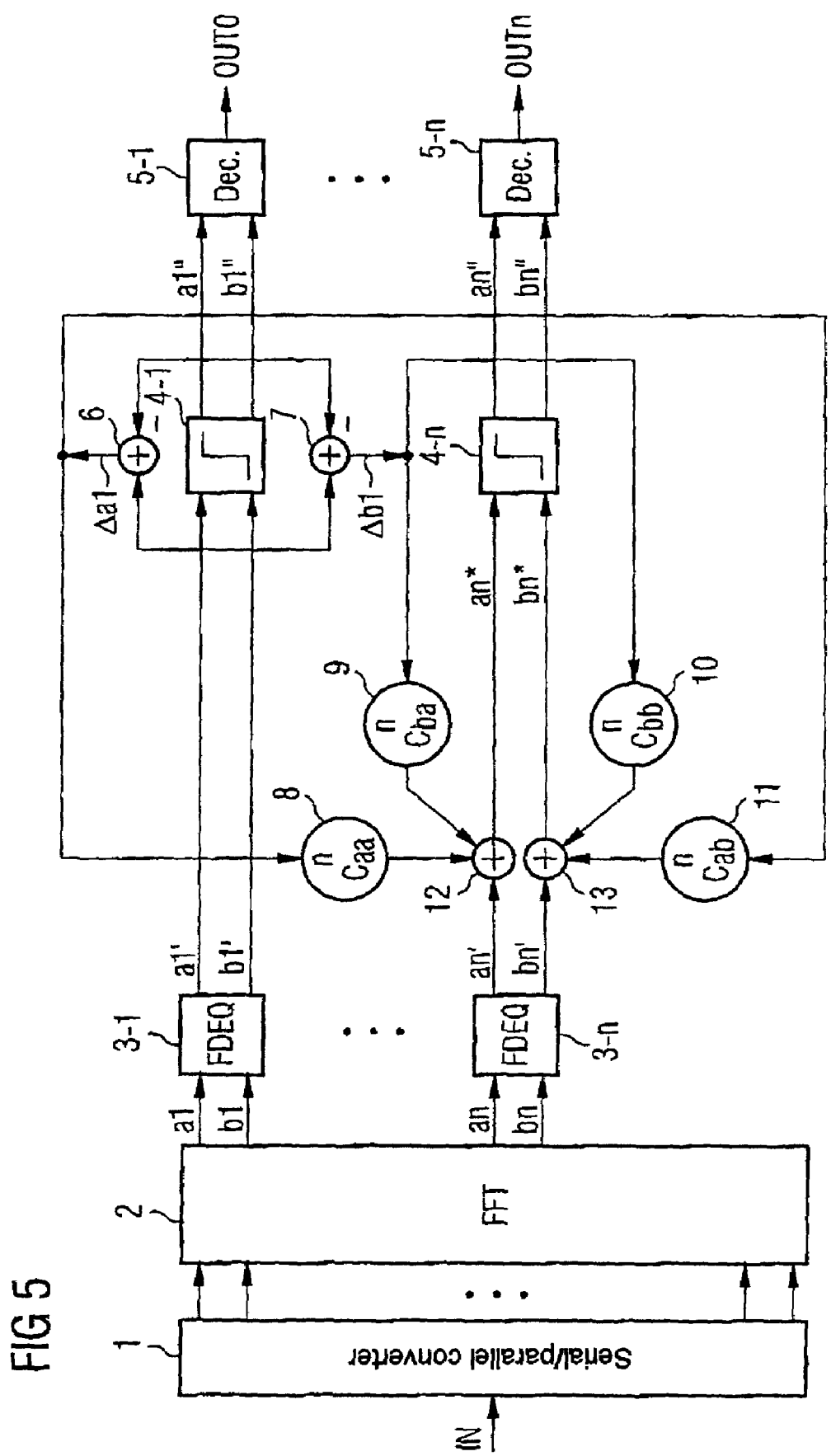
FIG. 5 shows a known circuit arrangement for compensating for disturbances in a signal generated by means of discrete multitone modulation.

With respect to the adjustment of the coefficients required for the compensation, the procedure described with respect to FIG. 5 can be used and reference is also made to DE 199 01 465. All coefficients can be adjusted in a simple manner by means of an iterative adjusting algorithm during the connection set-up and can also be readjusted during the data transmission, an ongoing adaptation to any changes in the transmission channel being possible. In this context, the so-called sign-sign algorithm, in which only the signs of the errors of the reference frequency channels before the compensation and of the errors of the corresponding user frequency channels are used, is particularly advantageous with respect to a simple implementation.

Compared with the method of equalization by means of a time domain equalizer, which is most used at present, the circuit arrangements and methods described here provide better characteristics with respect to remaining residual errors. Particularly elaborate methods for adjusting the coefficients of time domain equalizers can be replaced by a simple iterative adjustment method. The number of necessary multiplications per second is smaller since the compensation method specified here operates in the frequency domain at the block clock rate of the FFT demodulator.

Using the circuit arrangements described here, it is always possible to achieve a reduction in the residual error of the output signals, caused by the recovery of a transmission link (transmit and receive filters and transmission channel), to a predetermined measure. Depending on the characteristics of the transmission link, a circuit arrangement can be selected by means of which a sufficiently small residual error can be achieved.

Using error signal vectors with carrier frequencies which are not used for transmitting data via the transmission channel makes it possible to dispense with the use of decision circuits and subtracting circuits which are otherwise necessary for generating error signal vectors from reference signal vectors with carrier frequencies which are used for transmitting data via the transmission channel. This considerably simplifies the circuit arrangement and considerably reduces the expenditure for producing it.

The invention claimed is:

1. A circuit arrangement for compensating for disturbances in a signal generated by means of discrete multitone modulation (DMT), the signal generated by means of discrete multitone modulation exhibiting in the frequency domain a multiplicity of carrier frequencies which are used for transmitting data via a transmission channel, and each carrier frequency exhibiting a signal vector, comprising:
   (a) a multiplicity of first adder circuits, the multiplicity of first adder circuits being supplied with a first error signal vector and the multiplicity of first adder circuits adding the first error signal vector to at least one first signal vector in order to generate an error-corrected first signal vector; and
   (b) a multiplicity of first multiplier circuits which precede the multiplicity of first adder circuits and multiply the first error signal vector by adjustable coefficients, wherein the first error signal vector is a signal vector of a carrier frequency which is not used for transmitting data via the transmission channel.

2. The circuit arrangement as claimed in claim 1, wherein the first error signal vector is a signal vector of a carrier frequency which, in the frequency domain, is adjacent to a carrier frequency which is used for transmitting data via the transmission channel.

3. The circuit arrangement as claimed in claim 1, wherein the first error signal vector is a signal vector of a carrier frequency which, in the frequency domain, immediately precedes a carrier frequency which is used for transmitting data via the transmission channel.

4. The circuit arrangement as claimed in claim 1, wherein the circuit arrangement also exhibits the following features:
   (a) at least one further multiplicity of first adder circuits which follow the multiplicity of first adder circuits, the at least one further multiplicity of first adder circuits in each case being supplied with a further error signal vector and the at least one further multiplicity of first adder circuits adding the respective further error signal vector to the at least one signal vector in order to generate a progressively error-corrected signal vector; and
   (b) at least one further multiplicity of first multiplier circuits which precede the at least one further multiplicity of first adder circuits and multiply the respective further error signal vector by adjustable coefficients.

5. The circuit arrangement as claimed in claim 4, wherein the respective further error signal vector is in each case a signal vector of a carrier frequency which is not used for transmitting data via the transmission channel.

6. The circuit arrangement as claimed in claim 4, wherein the respective further error signal vector is in each case a previous version of a particular error signal vector.

7. The circuit arrangement as claimed in claim 6, wherein the circuit arrangement has at least one buffer circuit for storing a previous version of an error signal vector.

8. The circuit arrangement as claimed in claim 1, wherein the circuit arrangement also exhibits the following features:
   (a) a decision circuit which maps the error-corrected first signal vector into a value-discrete first signal vector; and
   (b) a subtracting circuit for forming a second error signal vector which subtracts the first signal vector (a1', b1') and the value-discrete first signal vector from one another, the second error signal vector being used for generating an error-corrected second signal vector of a second signal vector of a carrier frequency which is immediately adjacent to the carrier frequency of the first signal vector.

9. The circuit arrangement as claimed in claim 8, wherein the circuit arrangement also exhibits the following features:
   (a) a multiplicity of second adder circuits, the multiplicity of second adder circuits being supplied with the second error signal vector and the multiplicity of second adder circuits (12 1, 13 1) adding the second error signal vector to the second signal vector in order to generate the error-corrected second signal vector; and
   (b) a multiplicity of second multiplier circuits which precede the multiplicity of second adder circuits and multiply the second error signal vector by adjustable coefficients.

10. The circuit arrangement as claimed in claim 9, wherein the circuit arrangement also exhibits the following features:
    (a) a further decision circuit which maps the error-corrected second signal vector into a value-discrete second signal vector; and
    (b) a further subtracting circuit for forming a third error signal vector which subtracts the second signal vector and the value-discrete second signal vector from one another, the third error signal vector being used for generating an error-corrected third signal vector of a third signal vector of a carrier frequency which is immediately adjacent to the carrier frequency of the second signal vector.

11. The circuit arrangement as claimed in claim 1, wherein the adjustable coefficients can be adjusted by means of a correcting variable.

12. The circuit arrangement as claimed in claim 11, wherein a power of 2 is selected for the correcting variable.

13. A circuit arrangement for compensating for disturbances in a signal generated by means of discrete multitone modulation (DMT), the signal generated by means of discrete multitone modulation exhibiting in the frequency domain a multiplicity of carrier frequencies which are used for transmitting data via a transmission channel, and each carrier frequency exhibiting a signal vector, comprising:
    (a) decision circuits which are in each case supplied with a reference signal vector and which map the respective reference signal vector into a respective value-discrete reference signal vector;
    (b) subtracting circuits for forming a respective error signal vector which subtract the respective reference signal vector and the respective value-discrete reference signal vector from one another;
    (c) more than one group of first adder circuits, each group of first adder circuits in each case being supplied with an error signal vector and the groups of first adder circuits adding the respective error signal vectors to each of at least one signal vector in order to generate a progressively error-corrected signal vector; and
    (d) groups of first multiplier circuits which in each case precede a group of first adder circuits and multiply the respective error signal vector by adjustable coefficients.

14. A method for compensating for disturbances in a signal generated by means of discrete multitone modulation (DMT), the signal generated by means of discrete multitone modulation exhibiting in the frequency domain a multiplicity of carrier frequencies which are used for transmitting data via a transmission channel, and each carrier frequency exhibiting a signal vector, comprising the following steps:
    (a) multiplying at least one error signal vector by adjustable coefficients; and
    (b) adding the at least one error signal vector multiplied by the adjustable coefficients to at least one signal vector in order to generate an error-corrected signal vector, wherein the at least one error signal vector is a signal vector of a carrier frequency which is not used for transmitting data via the transmission channel.

15. The method as claimed in claim 14, wherein the first error signal vector is a signal vector of a carrier frequency which, in the frequency domain, is adjacent to a carrier frequency which is used for transmitting data via the transmission channel.

16. The method as claimed in claim 14, wherein the first error signal vector is a signal vector of a carrier frequency which, in the frequency domain, immediately precedes a carrier frequency which is used for transmitting data via the transmission channel.

17. The method as claimed in claim 14, wherein the method also exhibits the following steps:
    (a) multiplying a respective further error signal vector by adjustable coefficients; and
    (b) adding the respective further error signal vector multiplied by the adjustable coefficients to the at least one signal vector in order to generate a progressively error-corrected signal vector.

18. The method as claimed in claim 17, wherein the respective further error signal vector is in each case a signal vector of a carrier frequency which is not used for transmitting data via the transmission channel.

19. The method as claimed in claim 17, wherein the respective further error signal vector is in each case a previous version of a particular error signal vector.

20. The method as claimed in claim 14, wherein the method also exhibits the following steps:
    (a) mapping the error-corrected first signal vector into a value-discrete first signal vector; and
    (b) subtracting the first signal vector and the value-discrete first signal vector from one another in order to form a second error signal vector, the second error signal vector being used for generating an error-corrected second signal vector of a second signal vector of a carrier frequency which is immediately adjacent to the carrier frequency of the first signal vector.

21. The method as claimed in claim 20, wherein the method also exhibits the following steps:
    (a) multiplying the second error signal vector by adjustable coefficients; and
    (b) adding the second error signal vector multiplied by the adjustable coefficients to the second signal vector in order to generate the error-corrected second signal vector.

22. The method as claimed in claim 21, wherein the method also exhibits the following steps:
  (a) mapping the error-corrected second signal vector into a value-discrete second signal vector; and
  (b) subtracting the second signal vector and the value-discrete second signal vector from one another in order to form a third error signal vector, the third error signal vector being used for generating an error-corrected third signal vector of a third signal vector of a carrier frequency which is immediately adjacent to the carrier frequency of the second signal vector.

23. The method as claimed in claim 14, wherein the adjustable coefficients can be adjusted by means of a correcting variable.

24. The method as claimed in claim 23, wherein a power of 2 is selected for the correcting variable.

25. A method for compensating for disturbances in a signal generated by means of discrete multitone modulation (DMT), the signal generated by means of discrete multitone modulation exhibiting in the frequency domain a multiplicity of carrier frequencies which are used for transmitting data via a transmission channel, and each carrier frequency exhibiting a signal vector, comprising the following steps:
  (a) mapping a plurality of respective reference signal vectors into a plurality of respective value-discrete reference signal vectors;
  (b) subtracting the plurality of respective reference signal vectors and the plurality of respective value-discrete reference signal vectors from one another in order to form a plurality of respective error signal vectors;
  (c) multiplying each of the plurality of respective error signal vectors by adjustable coefficients; and
  (d) adding the plurality of respective error signal vectors multiplied by the adjustable coefficients to each of at least one signal vector in order to generate a progressively error-corrected signal vector.

26. A circuit arrangement for compensating for disturbances in a signal generated by means of discrete multitone modulation (DMT), the signal generated by means of discrete multitone modulation exhibiting in the frequency domain a multiplicity of carrier frequencies which are used for transmitting data via a transmission channel, and each carrier frequency exhibiting a signal vector, comprising:
  (a) decision circuits which are in each case supplied with a reference signal vector and which map the respective reference signal vector into a respective value-discrete reference signal vector;
  (b) subtracting circuits for forming a respective error signal vector which subtract the respective reference signal vector and the respective value-discrete reference signal vector from one another;
  (c) a multiplicity of first adder circuits, the multiplicity of first adder circuits in each case being supplied with an error signal vector from an adjacent carrier frequency and the multiplicity of first adder circuits adding the respective adjacent error signal vector to at least one signal vector in order to generate an error-corrected signal vector; and
  (d) a multiplicity of first multiplier circuits which in each case precede the multiplicity of first adder circuits and multiply the respective adjacent error signal vector by adjustable coefficients.

\* \* \* \* \*